L. S. CHICHESTER.
Grain Drier.

Patented Oct. 20, 1868.

Witnesses.

Inventor:
Lewis S. Chichester.

L. S. CHICHESTER.
Grain Drier.

No. 83,255.

Patented Oct. 20, 1868.

Witnesses:
Geo. D. Walker
Chas H. Smith

Inventor:
Lewis S. Chichester

LEWIS S. CHICHESTER, OF BROOKLYN, NEW YORK.

*Letters Patent No. 83,255, dated October 20, 1868.*

IMPROVEMENT IN GRAIN-DRIERS.

The Schedule referred to in these Letters Patent and making part of the same.

*To all whom it may concern:*

Be it known that I, LEWIS S. CHICHESTER, of Brooklyn, in the county of Kings, and State of New York, have invented and made a certain new and useful Improvement in Grain-Driers; and I do hereby declare the following to be a full, clear, and exact description of the said invention, reference being had to the annexed drawing, making part of this specification, wherein Figure 1 is a sectional plan of the said grain-drier at the line $z\ z$, fig. 2;

Figure 3:
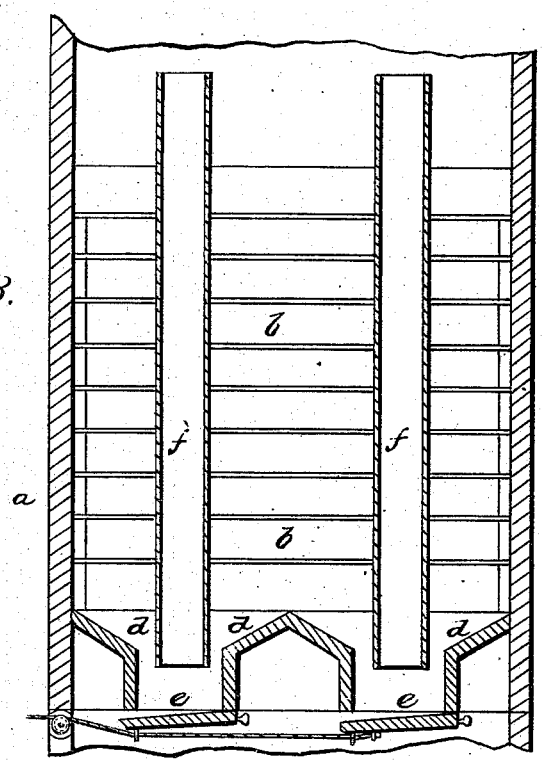
Figure 3 is a similar vertical section at the line $y\ y$. Similar marks of reference denote the same parts.
Figure 1:
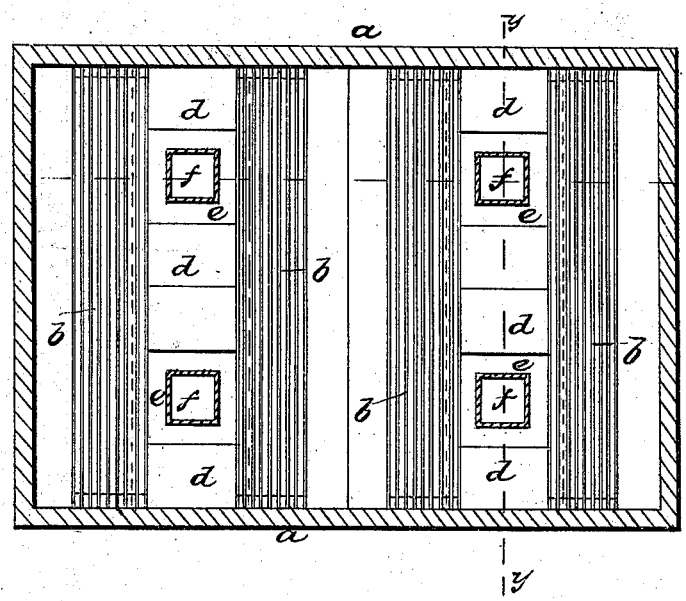
Figure 2:
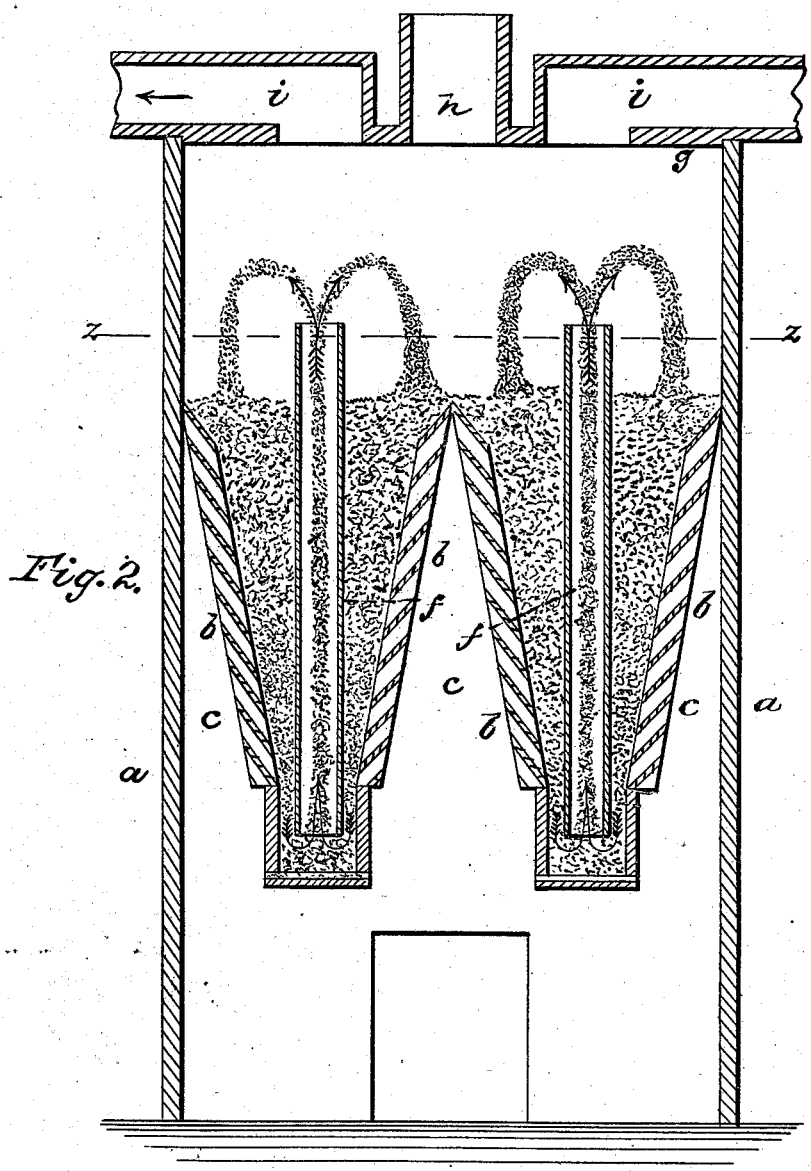
Figure 2 is a vertical section at the line $x\ x$.

Air has been used in a variety of grain-cleaners and winnowers for giving motion to the grain through a tube or spout.

The nature of my invention consists in a grain-drier, formed with an air-tube or tubes passing vertically, or nearly so, through the grain, and acting to effect a circulating movement of the grain, through the agency of a current of warm air that blows the grain through such tube from the lower part of the mass, and delivers it upon the upper part, thereby conveying heat to the grain and abstracting moisture, and at the same time the mass of grain is caused to change position, so that it cannot become injured by the heat, nor stuck together by the moisture.

In the drawing, $a$ is a casing of suitable size and shape, in which are ranges of slats, $b\ b$, supporting the grain, but allowing heated air to pass into the grain from the spaces $c\ c$, that are supplied with warm, dry air from any desired source.

The ranges of slats, $b\ b$, in connection with the inclined partitions $d\ d$, form hopper-shaped openings at the bottoms of the spaces, and valves, $e\ e$, or slides, are to be applied for allowing the grain to run out when properly dried, or treated.

The vertical air-tubes $f$ are sustained with their ends near the bottoms of the grain-spaces, and they are of sufficient length to pass through the grain, their open upper ends being some little above the surface of the grain.

$g$ is the top of the casing $a$, through which is an opening, $h$, for grain to be supplied. This opening is to be provided with a slide or cover, to be closed after the introduction of each charge of grain.

$i$ is an opening or openings, with a tube or tubes, to a blower, or other device, for producing a suction of air from the grain-drying apparatus.

The exhaustion of air from the upper part of the apparatus causes a strong current to pass up through the pipes $f$, and the grain will be conveyed by that current of air from one end of the tubes $f$ to the other, and then fall over upon the mass of grain in the apparatus, and the grain will keep constantly running down to the lower ends of the tubes $f$, so as to produce a circulation of the entire mass of grain from the top to the bottom, and at the same time a gentle current of air passes through the entire mass, and a strong current through the tubes $f$, violently agitating the grain in its passage, and abstracting the moisture, separating and suspending each grain, and allowing the air to act on all sides thereof, thereby thoroughly ventilating and drying the same.

What I claim, and desire to secure by Letters Patent, is—

A grain-drier, formed with air-tubes running through the grain-space, and open at both ends, substantially as specified, whereby a current of air causes a circulation of the mass of grain during the drying-operation, substantially as set forth.

In witness whereof, I have hereunto set my signature, this 8th day of June, A. D. 1868.

LEWIS S. CHICHESTER.

Witnesses:
CHAS. H. SMITH,
GEO. T. PINCKNEY.